US012731915B2

(12) United States Patent
Christophy et al.

(10) Patent No.: US 12,731,915 B2
(45) Date of Patent: Sep. 8, 2026

(54) MULTIBAND DUAL-ANTENNA SYSTEM

(71) Applicant: Hewlett-Packard Development Company, L.P., Spring, TX (US)

(72) Inventors: Miguel Christophy, San Francisco, CA (US); Imran A. Chaudhri, San Francisco, CA (US); Robert Hill, Medford, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 106 days.

(21) Appl. No.: 18/638,638

(22) Filed: Apr. 17, 2024

(65) Prior Publication Data

US 2024/0356244 A1 Oct. 24, 2024

Related U.S. Application Data

(60) Provisional application No. 63/460,025, filed on Apr. 18, 2023.

(51) Int. Cl.
*H01Q 21/30* (2006.01)
*H01Q 3/30* (2006.01)

(52) U.S. Cl.
CPC ............... *H01Q 21/30* (2013.01); *H01Q 3/30* (2013.01)

(58) Field of Classification Search
CPC ................................. H01Q 21/30; H01Q 3/30
See application file for complete search history.

(56) References Cited

U.S. PATENT DOCUMENTS

2012/0229347 A1* 9/2012 Jin ......................... H01Q 21/28 343/702
2014/0141731 A1 5/2014 Abudul-Gaffoor et al.
2018/0069616 A1 3/2018 Kim et al.
2019/0379105 A1 12/2019 Sayem et al.
2021/0066799 A1 3/2021 Avser et al.
(Continued)

FOREIGN PATENT DOCUMENTS

WO WO 2023/055041 4/2023

OTHER PUBLICATIONS

International Search Report and Written Opinion in International Appln. No. PCT/US24/24769, mailed on Jul. 18, 2024, 17 pages.
(Continued)

*Primary Examiner* — Graham P Smith
(74) *Attorney, Agent, or Firm* — Fish & Richardson P.C.

(57) ABSTRACT

In an embodiment, an antenna system comprises: a housing; a first wideband antenna integrated into a first metal portion of the housing to receive/transmit cellular radio frequency (RF) signals for a first set of frequency bands; a second wideband antenna integrated in a second metal portion of the housing to receive/transmit RF signals for a second set of frequency bands, and to operate as a MIMO antenna; non-conductive splits disposed between the first and second metal portions for electrically isolating the first and second antennas from one another; a first antenna feed structure configured to feed RF signals in the first set of frequency bands into the first antenna; a second antenna feed structure configured to feed RF signals in the second set of frequency bands into the second antenna; and a ground plane disposed in the housing and coupled to the first antenna and the second antenna.

20 Claims, 5 Drawing Sheets

(56) References Cited

U.S. PATENT DOCUMENTS

| | | | |
|---|---|---|---|
| 2021/0379105 | A1 | 12/2021 | Kohn et al. |
| 2024/0007135 | A1 | 1/2024 | Yoo et al. |

OTHER PUBLICATIONS

Kanel, "Sixth Sense Technology," Thesis for the Bachelor Degree of Engineering in Information and Technology, Centria University of Applied Sciences, May 2014, 46 pages.
Mann et al., "Telepointer: Hands-Free Completely Self Contained Wearable Visual Augmented Reality without Headwear and without any Infrastructural Reliance," IEEE Fourth International Symposium on Wearable Computers, Atlanta, GA, USA, Oct. 16-17, 2000, 4 pages.
Mann, "Wearable Computing: A First Step Toward Personal Imaging," IEEE Computer, Feb. 1997, 30(2):25-32.
Mann, "Wearable, tetherless computer-mediated reality," American Association of Artificial Intelligence Technical Report, Feb. 1996, 62-69, 8 pages.
Metavision.com [online], "Sensularity with a Sixth Sense," available on or before Apr. 7, 2015, via Internet Archive: Wayback Machine URL <http://web.archive.org/web/20170901072037/https://blog.metavision.com/professor-steve-mann-society-of-sensularity-with-a-sixth-sense/> retrieved on Apr. 25, 2023, URL <https://blog.metavision.com/professor-steve-mann-society-of-sensularity-with-a-sixth-sense/>, 4 pages.
Mistry et al., "WUW—wear Ur world: a wearable gestural interface", Proceedings of the 27th international conference Extended Abstracts on Human Factors in Computing Systems—CHI EA '09, Boston, MA, USA, Apr. 4-9, 2009, 6 pages.
Shetty et al., "Sixth Sense Technology," International Journal of Science and Research, Dec. 2014, 3(12):1068-1073.

* cited by examiner

MULTIBAND DUAL-ANTENNA SYSTEM

CROSS-REFERENCE TO RELATED APPLICATION

This application claims priority to U.S. Provisional Patent Application No. 63/460,025, filed Apr. 18, 2023, the entire contents of which are incorporated herein by reference.

TECHNICAL FIELD

This disclosure relates generally to multiband antenna architectures.

BACKGROUND

Modern mobile devices often integrate multiple communication technologies that require the use of an antenna system. For example, a smartphone can include wireless local area network (WLAN), Bluetooth (BT), cellular (e.g., 5G) and Long-Term Evolution (LTE) wireless communication technologies. To obtain a high data rate without consuming additional power, some mobile devices also utilize multiple-input multiple-output (MIMO) antennas. In addition to multiple communication technologies, modern mobile devices also utilize global navigation satellite system (GNSS) technology, such as Global Positioning System (GPS), which also requires an antenna.

For metal-rimmed mobile devices that employ multiple antennas, there is a potential for mutual coupling if the MIMO antennas share a common portion of the metal rim and operate in the same frequency band. Designing an antenna system that supports multiple communication technologies across multiple different frequency bands, GPS, and includes MIMO antennas without mutual coupling, presents a significant design challenge for small form factor mobile devices because of the limited space for layout of antenna components and customer demand for aesthetic appeal.

SUMMARY

A multiband dual-antenna system is disclosed.

In an embodiment, an antenna system comprises: a housing; a first wideband antenna integrated into a first metal portion of the housing, the first antenna configured to receive and transmit cellular radio frequency (RF) signals for a first set of frequency bands; a second wideband antenna integrated in a second metal portion of the housing different than the first metal portion of the housing, the second antenna configured to receive and transmit RF signals for a second set of frequency bands, the second wideband antenna further configured to operate as a multiple-input multiple-output (MIMO) antenna; electrically non-conductive splits disposed in the housing between the first and second metal portions for electrically isolating the first and second antennas from one another; a first antenna feed structure configured to feed RF signals in the first set of frequency bands into the first antenna; a second antenna feed structure configured to feed RF signals in the second set of frequency bands into the second antenna; and a ground plane disposed in the housing and coupled to the first antenna and the second antenna.

In an embodiment, the first set of frequency bands are three non-overlapping frequency bands, and the first antenna is configured to have resonant frequencies in the three non-overlapping frequency bands.

In an embodiment, the first antenna comprises two segments where a first segment is tuned for resonance in a first or second frequency band in the first set of frequency bands, and a second segment is tuned for resonance in a third frequency band in the first set of frequency bands that is lower than the first and second frequency bands.

In an embodiment, the antenna system of claim 3, further comprises: a metal transmission line coupling the first feed structure to the ground plane to increase an overall length of the first antenna.

In an embodiment, the antenna system further comprises: a switch configured to couple the first antenna to at least one of a plurality of inductors coupled to the ground plane to increase the bandwidth of the third frequency band.

In an embodiment, the switch is an aperture switch and the plurality of inductors includes three inductors having the values in the range of about 3.3 nH to about 15 nH.

In an embodiment, the switch is a 4 pole aperture switch where one pole is an open circuit and the other three poles couple three inductors, respectively, to the first antenna.

In an embodiment, the switch is actively controlled by a processor of a host device using the antenna system, depending on which band in the first set of frequency bands is available in an operating environment of the antenna system.

In an embodiment, the second antenna is configured to receive RF signals from a global navigation satellite system transmitter, and transmit and receive cellular RF signals and wireless local area network (WLAN) RF signals.

In an embodiment, the first feed structure and second feed structure include multiple RF filters configured to split off RF signals in the first and second sets of frequency bands, and feed the RF signals into one or more RF front ends.

In an embodiment, the first and second antennas are separated from the ground plane by an air gap.

In an embodiment, the housing is a bezel of a wearable multimedia device and the antenna system is integrated in the bezel.

In an embodiment, the first and second antennas are fabricated on a printed circuit board disposed in the housing.

In an embodiment, the cellular RF signals are Long Term Evolution (LTE) RF signals, and the first set of frequency bands are LTE frequency bands.

In an embodiment, the first frequency band in the first set of LTE frequency bands is from about 1710 MHz to about 2200 MHz.

In an embodiment, the second frequency band in the first set of LTE frequency bands is from about 600 MHz to about 960 MHz.

In an embodiment, the third frequency band in the first set of LTE frequency bands is from about 2490 MHz to about 2690 MHz.

In an embodiment, the second set of frequency bands includes a wireless local area network (WLAN) frequency band from about 5000 MHz to about 5990 MHz.

In an embodiment, the second antenna comprises two segments where a first segment is tuned for resonance in a first frequency band in the second set of frequency bands, and a first portion of the second segment is tuned for resonance in a second frequency band in the second set of frequency bands.

In an embodiment, a second portion of the second segment is coupled between to the ground plane at two ground plane locations to prevent the second portion from radiating as an antenna.

The implementations described herein can provide various technical benefits. For example, the disclosed embodiments provide a multiband dual-antenna system with a single feed structure. The disclosed multiband dual-antenna system includes a first antenna that supports multiple LTE bands, and a second, diversity antenna that supports WLAN, Bluetooth and GNSS. Each antenna provides wideband coverage and uses a single feed structure, which is desirable for small form factor mobile devices. The second antenna maintains a balanced industrial design with adequate isolation levels, while functioning as an effective MIMO antenna. A switch (e.g., a 4 pole switch) utilizes inductors coupled to a ground plane to increase bandwidth for the low band, and is actively controlled depending on which antenna band is available in the operating environment of the mobile device.

The details of the disclosed embodiments are set forth in the accompanying drawings and the description below. Other features, objects and advantages are apparent from the description, drawings and claims.

DESCRIPTION OF DRAWINGS

The same reference symbol used in various drawings indicates like elements.

DETAILED DESCRIPTION

Example Wearable Multimedia Device

Figure 1:
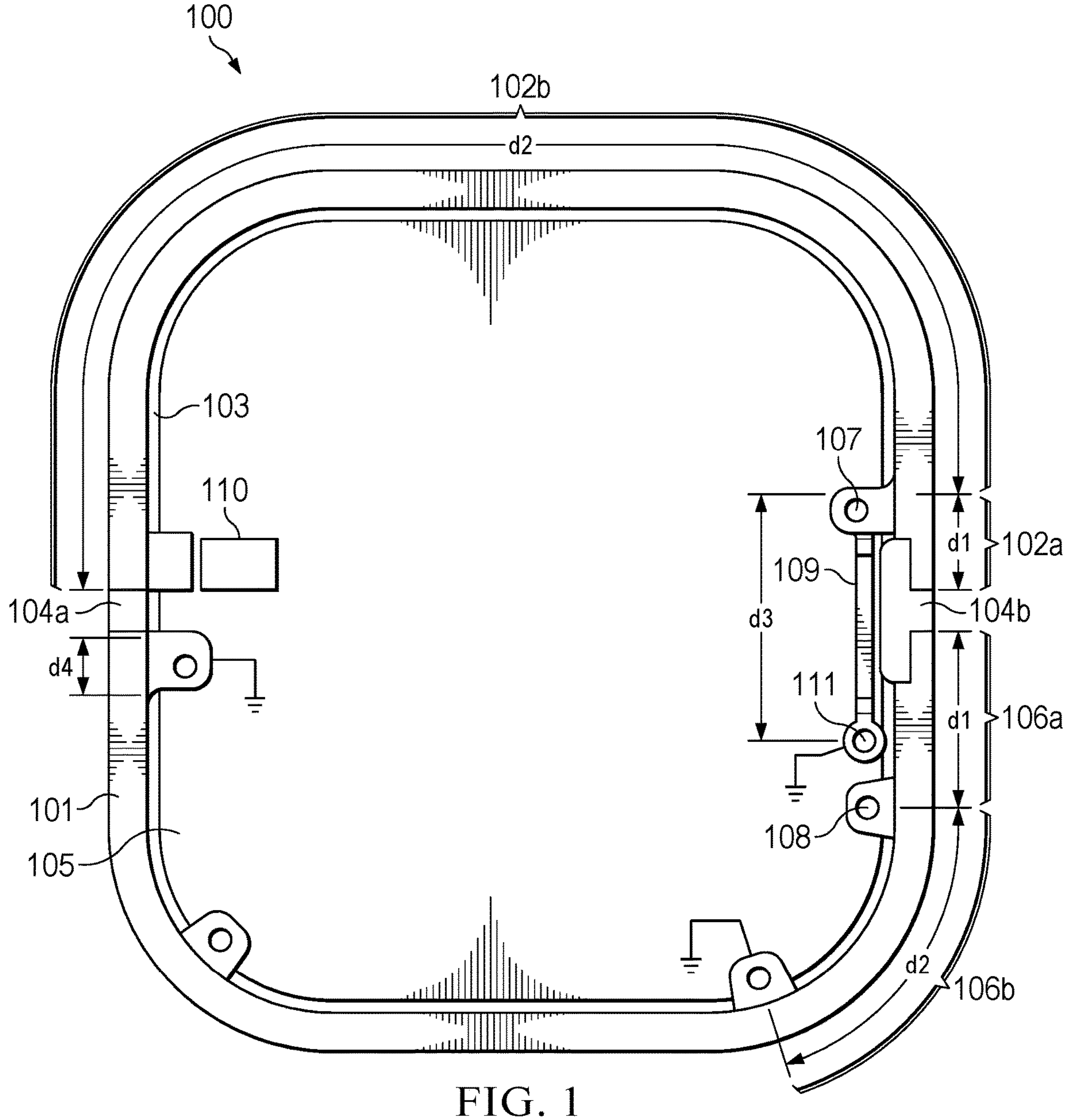
FIG. 1 is a top plane view diagram of an antenna system for wearable multimedia device, according to an embodiment.

The antenna system described herein can be implemented on a wearable multimedia device. In an embodiment, an exemplary wearable multimedia device is a lightweight, small form factor, battery-powered device that can be attached to a user's clothing or an object using a tension clasp, interlocking pin back, magnet, or any other attachment mechanism. The wearable multimedia device includes a digital image capture device (e.g., a camera with a 180° FOV with optical image stabilizer (OIS)) that allows a user to spontaneously and/or continuously capture multimedia data (e.g., video, audio, depth data, biometric data) of life events ("moments") and document transactions (e.g., financial transactions) with minimal user interaction or device set-up. The multimedia data ("context data") captured by the wireless multimedia device is uploaded to a cloud computing platform with an application ecosystem that allows the context data to be processed, edited and formatted by one or more applications (e.g., Artificial Intelligence (AI) applications) into any desired presentation format (e.g., single image, image stream, video clip, audio clip, multimedia presentation, or image gallery) that can be downloaded and replayed on the wearable multimedia device and/or any other playback device. For example, the cloud computing platform can transform video data and audio data into any desired filmmaking style (e.g., documentary, lifestyle, candid, photojournalism, sport, street) specified by the user.

In an embodiment, the wearable multimedia device includes a Global Navigation Satellite System (GNSS) receiver (e.g., Global Positioning System (GPS)) and one or more inertial sensors (e.g., accelerometers, gyroscopes) for determining the location and orientation of the user wearing the device when the context data was captured. In an embodiment, one or more images in the context data can be used by a localization application, such as a visual odometry application, in the application ecosystem to determine the position and orientation of the user.

In an embodiment, the wearable multimedia device includes short range communication technology, including but not limited to Bluetooth, IEEE 802.15.4 (ZigBee™) and near field communications (NFC). The short range communication technology can be used to wirelessly connect to a wireless headset or earbuds in addition to, or in place of the headphone jack, and/or can wirelessly connect to any other external device (e.g., a computer, printer, projector, television and other wearable devices).

In an embodiment, the wearable multimedia device includes a wireless transceiver and communication protocol stacks for a variety of communication technologies, including multi-band LTE, WiFi, 3G, 4G and 5G communication technologies.

Antenna System Overview

The disclosed antenna system includes two antennas of a single metal housing, separated by molded plastic "splits" that electrically isolate one antenna from the other antennas. A first antenna (also referred to as the "main antenna") is a wideband antenna configured to have resonant frequencies in three LTE bands, referred to as low band (600-960 MHz), mid band (1710-2200 MHz) and high band (2490-2690 MHz). The first or main antenna is divided into two segments where a first segment is tuned for resonance in the mid/high band and the second segment is tuned for resonance in the low band. The combination of the first segment and second segment provide a third resonance. A metal transmission line feed structure allows for improved S11 matching for LTE lowband and effectively increases the overall length of the first antenna without increasing the form factor of the host device, which is important for small, portable consumer electronic devices. Coupled to the first antenna is a switch (e.g., a 4 pole switch). The switch uses 4 inductors coupled to ground to increase the bandwidth of the low LTE band. In an embodiment, the switch is actively controlled by a system processor (e.g., a system processor of the host device) depending on which antenna band is available in the particular operating environment of the antenna system.

The second antenna is a wideband diversity receiving (Rx) antenna, as well as a MIMO antenna for both transmitting (Tx) and Rx. The second antenna is also a wideband antenna with coverage for GNSS (e.g., 1510-15050 MHz) or other GNSS, mid band (e.g., 1710-2200 MHz), WLAN/BT (e.g., 2400-2490 MHz), high band (e.g., 2490-2690 MHz) and WLAN 5_GHz (e.g., 5000-5990 MHz).

Each of the first and second antennas use a single feed structure that includes multiple radio frequency (RF) filters configured to split off the desired bands and feed them into one or more RF front ends (e.g., comprising bandpass filters, low noise amplifiers, local oscillators, and analog to digital converters).

Example Embodiments

FIG. 1 is a top plan view diagram of an antenna system 100 for wearable multimedia device, according to an embodiment. Antenna system 100 includes housing 101, antenna segments 102*a*, 102*b* comprising a first antenna, air gap 103, splits 104*a*, 104*b*, ground plane 105, antenna segments 106*a*, 106*b* comprising a second antenna, first antenna feed 107, second antenna feed 108, transmission line 109, switch 110 and ground. In the embodiment shown, antenna system 100 is integrated into a metal-rimmed housing of a wearable media device, as described above. In another embodiment, the housing is a bezel of a wearable multimedia device and the antenna system is integrated in the bezel. In another embodiment, the first and second antennas are fabricated on a printed circuit board (e.g., metal traces) disposed in the housing and/or a bezel. The first and second antenna can include but are not limited to: a printed dipole antenna (single or double-layer, dual-polarized), a microstrip antenna (including stacked microstrip antennas), printed loop antenna, slot antenna, planar antenna and planar inverted-F (PIFA) antenna.

Figure 4:
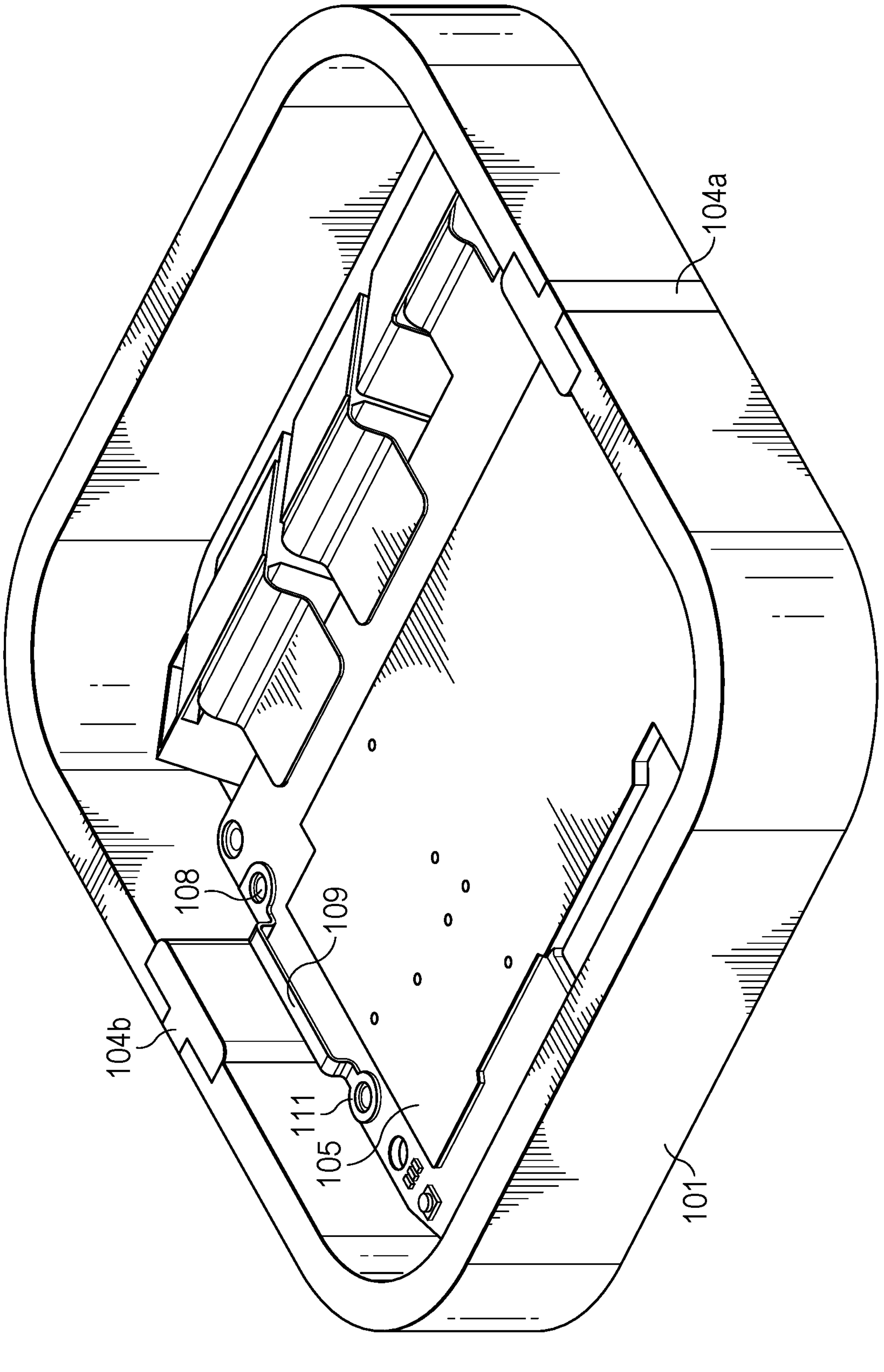
FIG. 4 is a perspective view of a housing showing various components of the antenna system shown in FIGS. 1-3B, according to an embodiment.

A first or main antenna comprises segments 102*a*, 102*b* having lengths d1 and d2, respectively, where segment 102*a* is separated from the second antenna by molded plastic split 104*b* and segment 102*b* is separated from the second antenna by non-conductive split 104*a* (e.g., a molded plastic split as shown in FIG. 4). Segment 102*a* is coupled to metal transmission line 109 of length d3. Transmission line 109 terminates at ground terminal of ground plane 105. Antenna feed 107 feeds RF signals to the first antenna and antenna feed 108 feeds RF signals to the second antenna. Switch 110 is coupled to segment 102*b* of the first antenna, and uses four inductors coupled to ground to increase the bandwidth for the low LTE band. In an embodiment, switch 110 is actively controlled by, for example a system processor of a host device, such as a processor of a wearable multimedia device described above. The first or main antenna is divided into two segments where a first segment is tuned for resonance in the mid/high band and the second segment is tuned for resonance in the low band. The combination of the first segment and second segment provide a third resonance. The transmission line allows for improved S11 matching for LTE low-band and is used to effectively increase the overall length of the metal housing 101 without increasing the form factor of the wearable multimedia device.

The second antenna comprises segments 106*a*, 106*b*. The second antenna is a wideband diversity receiving antenna with coverage for GNSS (e.g., GPS), mid band, WLAN/BT, high band and WLAN 5 GHz, as described above. The second antenna is configured to function as a MIMO antenna (e.g., 2×2 MIMO antenna). The second antenna is shorted at length d1 plus d2 to ground plane 105 at ground terminal. The open end of the housing 101 is shorted to ground plane 105 at ground terminal in the region of split 104*a* to reduce the effectiveness of the metal structure between ground terminals from resonating as an antenna. This design allows antenna system 100 to provide adequate isolation levels for MIMO.

Figure 2:
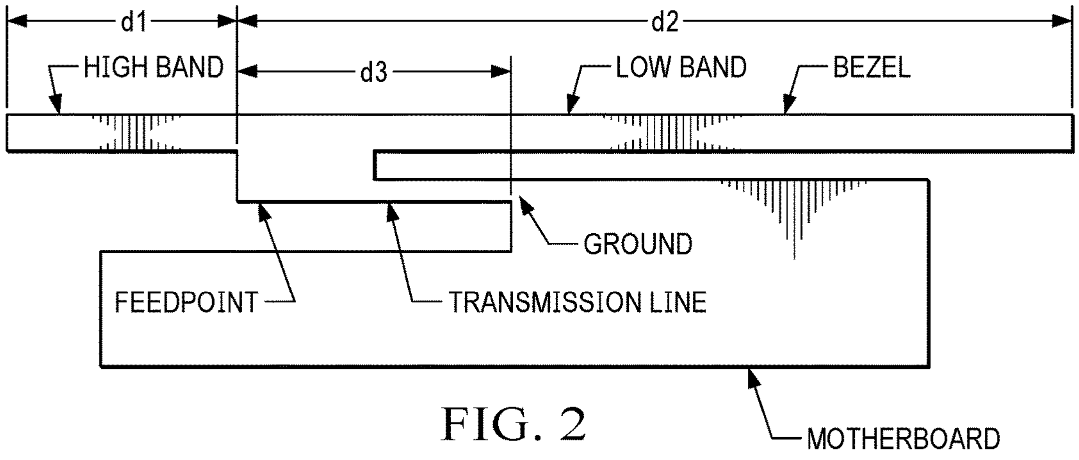
FIG. 2 further illustrates the antenna system shown in FIG. 1, according to an embodiment.

FIG. 2 further illustrates the antenna system shown in FIG. 1, according to an embodiment. The distances d1 and d2 of segments 102*a*, 102*b*, respectively, of the first or main antenna is shown. Segment 102*a* of length d1 is tuned for resonance in the mid/high bands and segment 102*b* of length d2 is tuned for resonance in the low band. The combination of segments 102, 102*b* is tuned for a third resonance. Metal transmission line 109 of length d3 effectively increases the overall length of the metal housing 101 without adding any significant length to the product form factor/size.

Figure 3A:
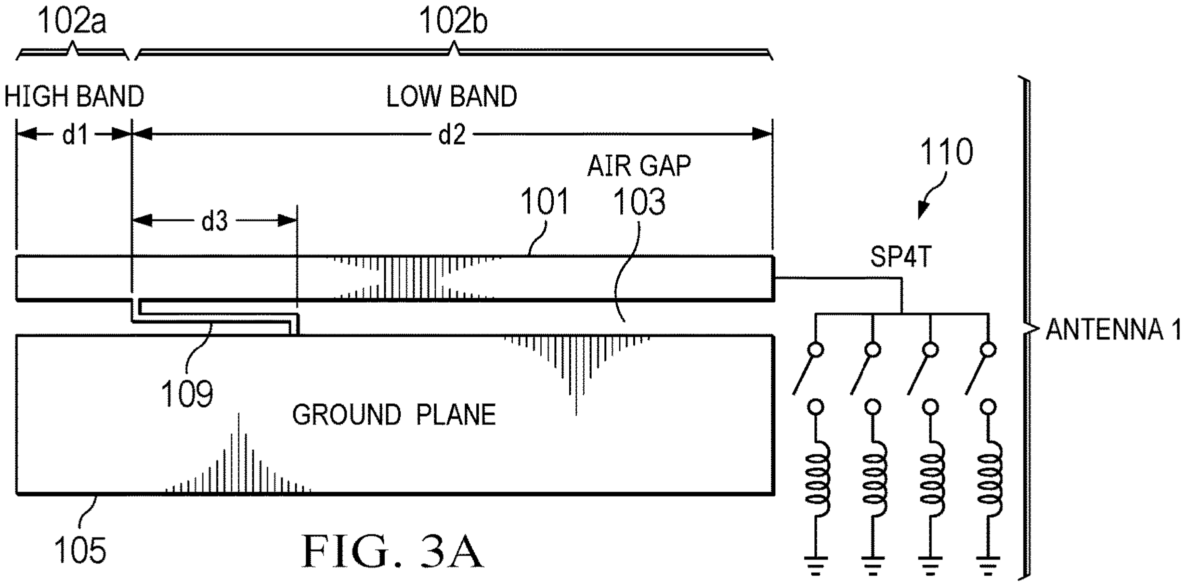
FIGS. 3A, 3B are side views of the antenna system shown in FIG. 1, according to an embodiment.
Figure 3B:
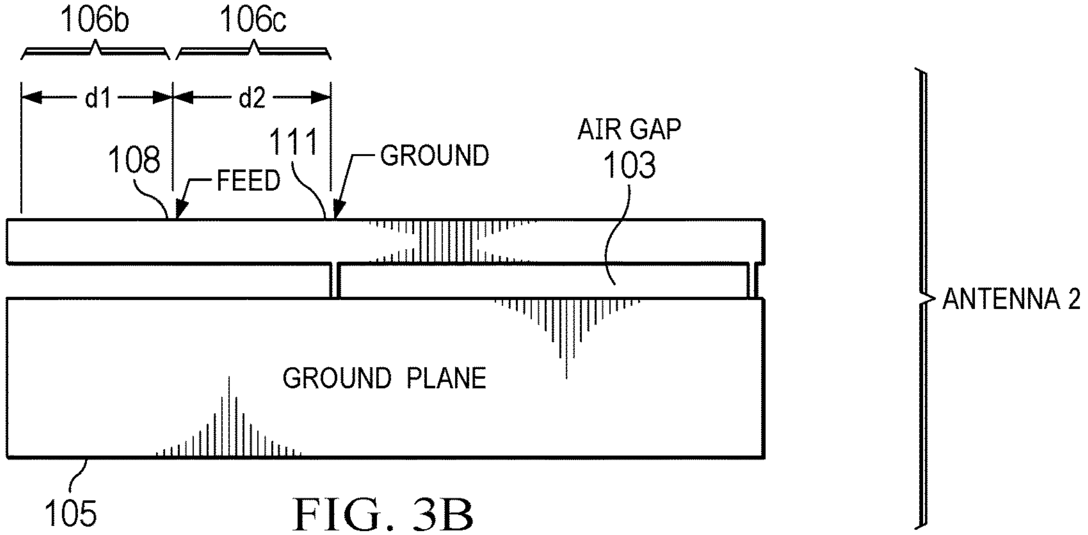

FIGS. 3A, 3B are side views of the antenna system shown in FIG. 1, according to an embodiment. FIG. 3A represents the first or main antenna for LTE bands and operates as previously described. The 4 pole switch (SP4T) 100 couples one or more of 4 inductors to ground to adjust the bandwidth of the LTE low band. The use of transmission line 109 to effectively extend the length of segment 102*a* from d1 to d1+d3. FIG. 3B represents the second diversity antenna. The location of ground terminals ensure that the metal structure between terminals does not resonate as an antenna.

FIG. 4 is a perspective view of housing 101 showing various components of the antenna system 100 shown in FIGS. 1-3B, according to an embodiment. In this view, metal transmission line 109 is shown coupled to feed 107 and ground terminal. Also shown is molded plastic split 104*a* for isolating the first and second antennas from each other.

Figure 5A:
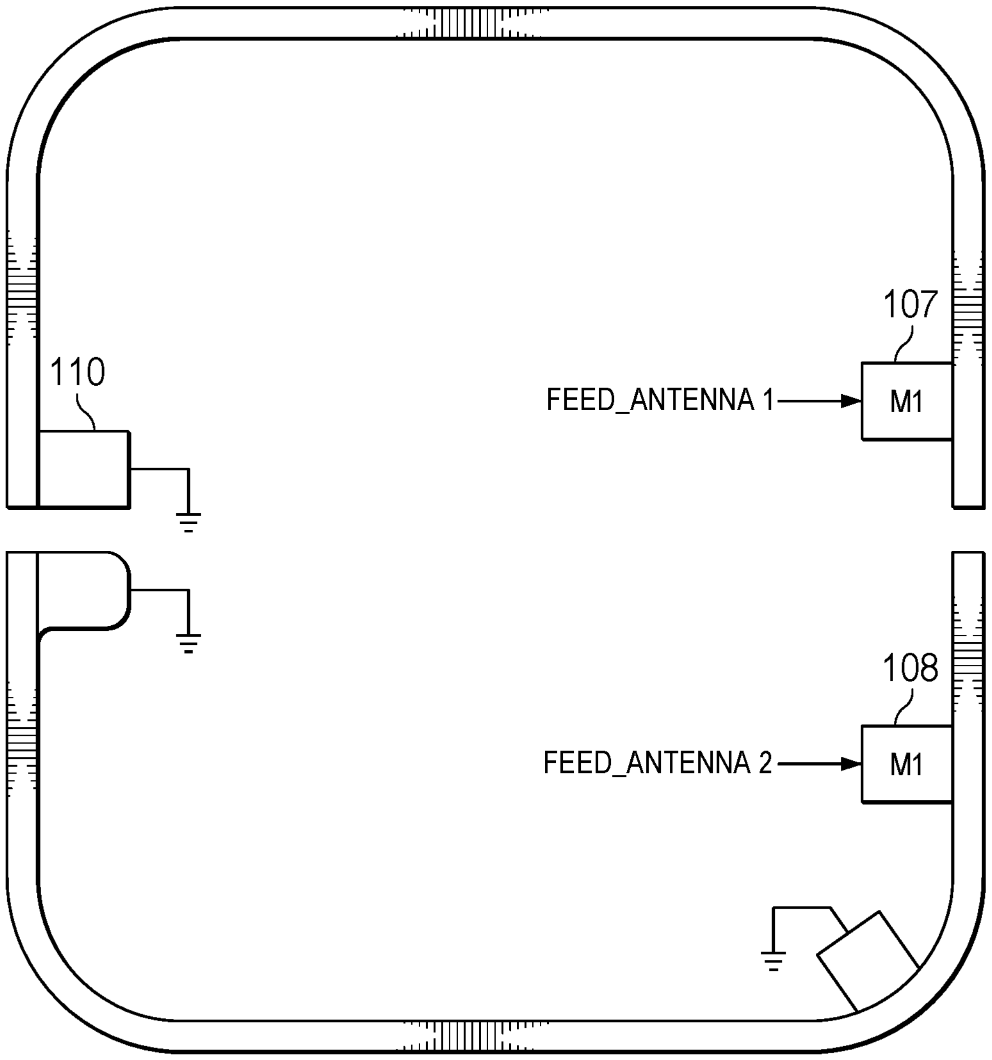
FIGS. 5A and 5B illustrate an aperture switch for switching between LTE bands, according to an embodiment.
Figure 5B:
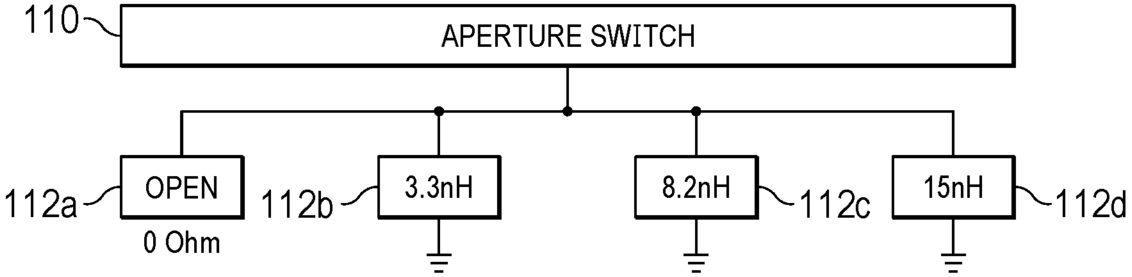

FIGS. 5A and 5B illustrate an aperture switch 110 for switching between LTE bands, according to an embodiment. In an embodiment, aperture switch 110 is actively controlled by a system processor to operate in one of an open state 112*a* (no inductors coupled to ground plane), a first inductor coupled to the ground plane (e.g., 3.3 nH), a second inductor coupled to the ground plane (e.g., 8.2 nH) and a third inductor coupled to the ground plane (e.g., 15 nH).

Figure 6:
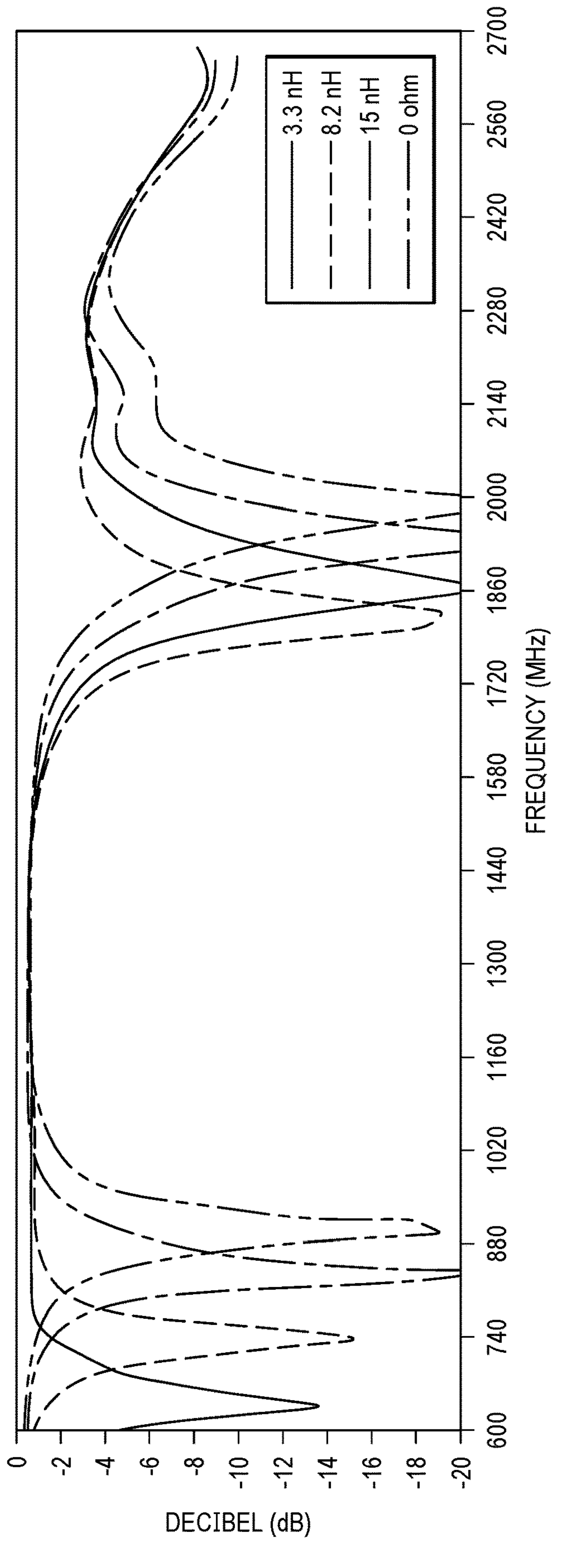
FIG. 6 illustrates performance of the antenna system shown in FIGS. 1-5B, according to an embodiment.

FIG. 6 illustrates the performance characteristics of antenna system 100 shown in FIGS. 1-5. The unit of the horizontal axis is MHz and the unit of the vertical axis is decibel (dB). Plots are shown for antenna return loss for each of the inductors of 3.3 nH, 8.2 nH and 15 nH that are coupled to the main antenna and ground by switch 110. Antenna return loss indicates the proportion of radio waves arriving at the main antenna input that are rejected as a ratio against radio waves that are accepted. A high return loss is a favorable measurement parameter that generally correlates to a low insertion loss. As can be observed, in the low, mid and high bands of interest the antenna return loss for LTE is −13 dB or higher at the band ends.

The features described may be implemented in digital electronic circuitry or in computer hardware, firmware, software, or in combinations of them. The features may be implemented in a computer program product tangibly embodied in an information carrier, e.g., in a machine-readable storage device, for execution by a programmable processor. Method steps may be performed by a programmable processor executing a program of instructions to perform functions of the described implementations by operating on input data and generating output.

The described features may be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that may be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random-access memory or both. The essential elements of a computer are a processor for executing instructions and one or more memories for storing instructions and data. Generally, a computer may communicate with mass storage devices for storing data files. These mass storage devices may include magnetic disks, such as internal hard disks and removable disks; magneto-optical disks; and optical disks. Storage devices suitable for tangibly embodying computer program instructions and data include all forms of non-volatile memory, including by way of example, semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits). To provide for interaction with a user the features may be implemented on a computer having a display device such as a CRT (cathode ray tube), LED (light emitting diode) or LCD (liquid crystal display) display or monitor for displaying information to the author, a keyboard and a pointing device, such as a mouse or a trackball by which the author may provide input to the computer.

One or more features or steps of the disclosed embodiments may be implemented using an Application Programming Interface (API). An API may define on or more parameters that are passed between a calling application and other software code (e.g., an operating system, library routine, function) that provides a service, that provides data, or that performs an operation or a computation. The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API. In some implementations, an API call may report to an application the capabilities of a device running the application, such as input capability, output capability, processing capability, power capability, communications capability, etc.

A number of implementations have been described. Nevertheless, it will be understood that various modifications may be made. Elements of one or more implementations may be combined, deleted, modified, or supplemented to form further implementations. In yet another example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. An antenna system comprising:

a housing;

a first wideband antenna integrated into a first metal portion of the housing, the first antenna configured to receive and transmit cellular radio frequency (RF) signals for a first set of frequency bands;

a second wideband antenna integrated in a second metal portion of the housing different than the first metal portion of the housing, the second antenna configured to receive and transmit RF signals for a second set of frequency bands, the second wideband antenna further comprising two segments, the two segments configured to operate as a multiple input multiple output (MIMO) antenna independent of the first wideband antenna;

electrically non-conductive splits disposed in the housing between the first and second portions for electrically isolating the first and second antennas from one another;

a first antenna feed structure configured to feed RF signals in the first set of frequency bands into the first antenna;

a second antenna feed structure configured to feed RF signals in the second set of frequency bands into the second antenna; and a ground plane disposed in the housing and coupled to the first antenna and the second antenna.

2. The antenna system of claim 1, wherein the first set of frequency bands are three non-overlapping frequency bands, and the first antenna is configured to have resonant frequencies in the three non-overlapping frequency bands.

3. The antenna system of claim 2, wherein the first antenna comprises two segments where a first segment is tuned for resonance in a first or second frequency band in the first set of frequency bands, and a second segment is tuned for resonance in a third frequency band in the first set of frequency bands that is lower than the first and second frequency bands.

4. The antenna system of claim 3, further comprising:

a metal transmission line coupling the first feed structure to the ground plane to increase an overall length of the first antenna.

5. The antenna system of claim 4, further comprising:

a switch configured to couple the first antenna to at least one of a plurality of inductors coupled to the ground plane to increase the bandwidth of the third frequency band.

6. The antenna system of claim 5, wherein the switch is an aperture switch and the plurality of inductors includes 3 or more inductors.

7. The antennas system of claim 5, wherein the switch is a 4 pole aperture switch where one pole is an open circuit and the other three poles couple three inductors, respectively, to the first antenna.

8. The antenna system of claim 5, wherein the switch is actively controlled by a processor of a host device using the antenna system, depending on which band in the first set of frequency bands is available in an operating environment of the antenna system.

9. The antenna system of claim 1, wherein the second antenna is configured to receive RF signals from a global navigation satellite system transmitter, and transmit and receive cellular RF signals and wireless local area network (WLAN) RF signals.

10. The antenna system of claim 1, wherein the first feed structure and second feed structure include multiple RF filters configured to split off RF signals in the first and second sets of frequency bands, and feed the RF signals into one or more RF front ends.

11. The antenna system of claim 1, wherein the first and second antennas are separated from the ground plane by an air gap.

12. The antenna system of claim 1, wherein the housing is a bezel of a wearable multimedia device and the antenna system is integrated in the bezel.

13. The antenna system of claim 1, wherein the first and second antennas are fabricated on a printed circuit board disposed in the housing.

14. The antenna system of claim 1, wherein the cellular RF signals are Long Term Evolution (LTE) RF signals, and the first set of frequency bands are LTE frequency bands.

15. The antenna system of claim 14, wherein the first frequency band in the first set of LTE frequency bands is from about 1710 MHz to about 2200 MHz.

16. The antenna system of claim 14, wherein the second frequency band in the first set of LTE frequency bands is from about 600 MHz to about 960 MHz.

17. The antenna system of claim 14, wherein the third frequency band in the first set of LTE frequency bands is from about 2490 MHz to about 2690 MHz.

18. The antenna system of claim 1, wherein the second set of frequency bands includes a wireless local area network (WLAN) frequency band from about 5000 MHz to about 5990 MHz.

19. The antenna system of claim 1, where a first segment of the two segments is tuned for resonance in a first frequency band in the second set of frequency bands, and a first portion of a second segment of the two segments is tuned for resonance in a second frequency band in the second set of frequency bands.

20. The antenna system of claim 19, wherein a second portion of the second segment is coupled between to the ground plane at two ground plane locations to prevent the second portion from radiating as an antenna.

* * * * *